… … …

United States Patent [19]

Hashiura et al.

[11] Patent Number: 4,527,043
[45] Date of Patent: Jul. 2, 1985

[54] LASER MACHINING SYSTEM

[75] Inventors: Masayoshi Hashiura; Akiyasu Okazaki; Sigeru Suzuki, all of Hitachi, Japan

[73] Assignee: Hitachi, Ltd., Tokyo, Japan

[21] Appl. No.: 581,267

[22] Filed: Feb. 17, 1984

[30] Foreign Application Priority Data

Feb. 18, 1983 [JP] Japan .................................. 58-24638

[51] Int. Cl.³ ............................................. B23K 27/00
[52] U.S. Cl. ....................... 219/121 LQ; 219/121 LC; 219/121 LH; 350/624
[58] Field of Search .................. 219/121 LQ, 121 LP, 219/121 LG, 121 LN, 121 LC, 121 LD, 121 LH, 121 LJ; 350/623, 624

[56] References Cited

U.S. PATENT DOCUMENTS 4,315,130  2/1982  Inagaki et al. ............ 219/121 LM X

FOREIGN PATENT DOCUMENTS 94482  6/1982  Japan ............................ 219/121 LP Primary Examiner—C. L. Albritton
Attorney, Agent, or Firm—Antonelli, Terry & Wands

[57] ABSTRACT

In a laser machining system for the heat treatment of an object, a pair of cylindrical concave mirrors are used to receive a source laser beam and irradiate a linear laser beam on to the object. The system is further provided between the latter cylindrical mirror and the object with at least a pair of slant-type plane mirrors for conditioning the linear beam. The plane mirrors have means for variably making the lengthwise dimension of the output linear beam smaller than that of the incident linear beam, so that a linear laser beam of various lengthwise dimensions can be produced.

10 Claims, 7 Drawing Figures

FIG. IA
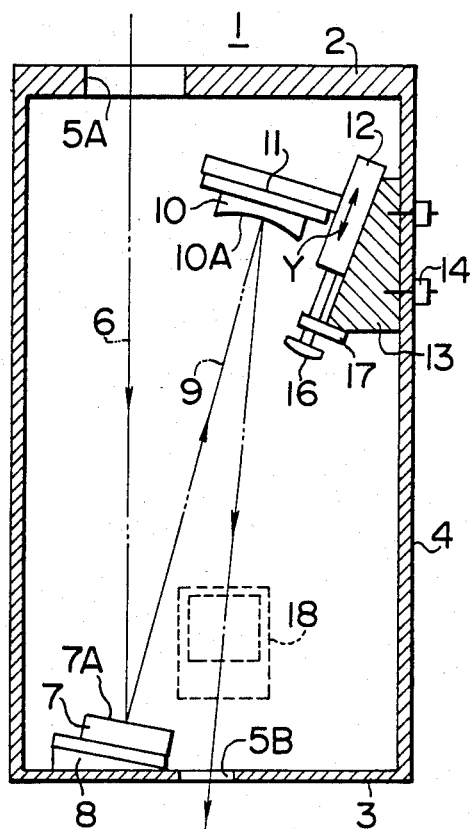
FIG. IB
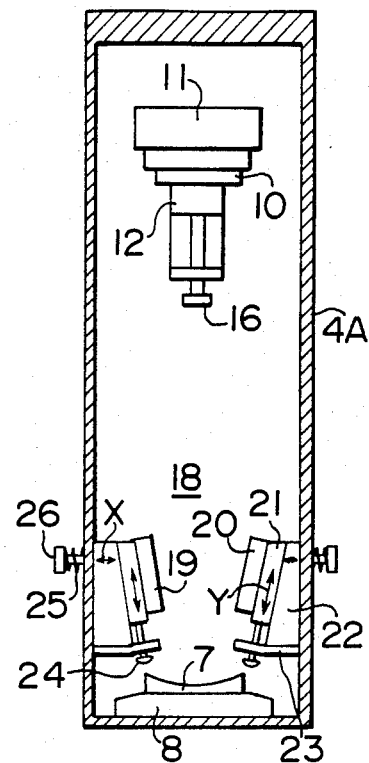
FIG. IC
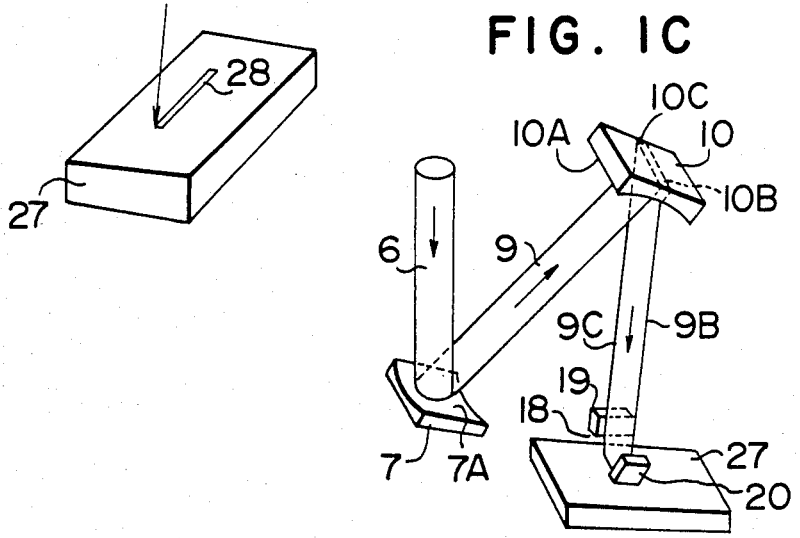

LASER MACHINING SYSTEM

The present invention relates to a laser machining system having an improved structure of at least a pair of plane mirrors disposed between a cylindrical mirror and a work piece.

The laser beam has been used mostly in the form of a spot beam. More recently, however, attention has increasingly be paid to linear laser beams of a rectangular cross section having a large lengthwise dimension relative to the traversing dimension and having a uniform energy distribution. Such linear laser beams are used in the quenching process for the mechanical component parts in power switching devices. The power switching device operates to conduct or shut off the current by making or breaking the contacts through the action of the operating mechanism which is principally made up of the mechanical components such as links, hooks, pins, and rods. These components are assembled, e.g., a link is joined to a hook through a pin, and the joint section is subjected to a large operating force and must be prevented from breakdown. On this account joint sections are processed by quenching so as to provide an increased hardness for them. The width of quenched area differs depending on the sizes of each component part and portion to be quenched.

Conventionally, the quenching process has been carried out using a laser machining system of so-called "N-type disposition", in which, for example, the first cylindrical concave mirror 7 (FIG. 1C) is placed aslant in the system, the second cylindrical concave mirror 10 (FIG. 1C) is placed aslant as a diagonal position over the first concave mirror within the system, i.e., as a condenser lens, and a work piece is placed below the second cylindrical concave mirror. In this arrangement, the laser beam is formed into a linear beam with a rectangular cross section by the second cylindrical concave mirror, and it is irradiated on to the work piece to form a quenching layer thereon. The quenching layer has a variable lengthwise dimension depending on the size of work pieces, and the maximum lengthwise dimension depends on the maximum laser beam diameter produced by the laser source. Therefore, if a smaller lengthwise dimension is needed, the first cylindrical concave mirror is replaced with a cylindrical concave mirror having a curvature smaller than that of the maximum lengthwise dimension of quenching so as to much converge the linear beam. Converging a linear laser beam needs the use of a cylindrical mirror with much smaller curvature. The use of several types of cylindrical concave mirrors is costly and is also a time-consuming job for replacing the mirrors.

In an alternative method, in which an output mirror having an aperture is used so that the unnecessary portion of the laser beam is blocked, much laser energy is lost unused and thus the power efficiency is low.

It is an object of the present invention to provide a laser quenching system which operates efficiently and provides linear laser beams of many lengthwise dimensions by use of at least a pair of plane mirrors.

In order to achieve the objective, the laser machining system of the present invention features that a linear laser beam reflected from a cylindrical mirror is incident to at least a pair of slant-type plane mirrors located between the cylindrical mirror and a work piece, the slant-type plane mirrors being provided with a means for making variably the lengthwise dimension of the reflected linear beam smaller than that of the incident linear beam, thereby producing linear laser beams of various lengthwise dimensions.

FIGS. 1A and 1B are side sectional views of the laser quenching system embodying the present invention;

FIG. 1C is a perspective view of the principal portion of the system shown in FIG. 1A;

Figure 2:
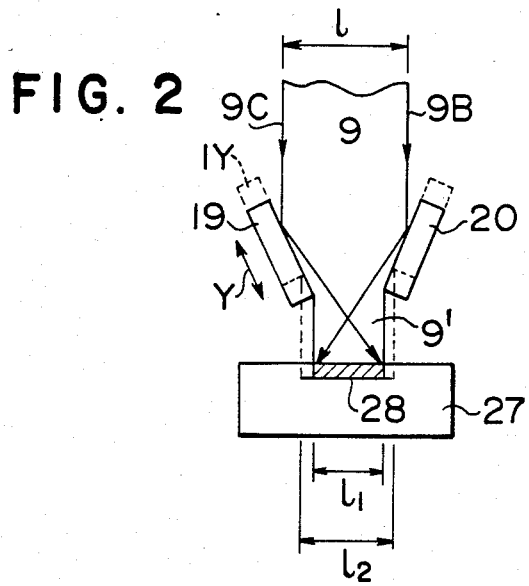
FIG. 2 is a side sectional view showing the principal structure of the system shown in FIGS. 1A and 1B.

The inventive laser machining system will now be described with reference to FIGS. 1A, 1B and 1C.

A head box 1 for heat processing is in the shape of a cuboid, having a top board 2, bottom board 3, and side boards 4 made of steel sheets. One of the side boards 4 is provided with a door (not shown) allowing access to the inside of the box 1. The first opening 5A and second opening 5B are formed in the top board 2 and bottom board 3, respectively. The first opening 5A is used to introduce a laser beam 6 produced by a laser source (not shown) into the box 1. The laser beam 6 is incident on the first cylindrical concave mirror 7 which, with its reflection surface 7A facing upward, is supported by a slant base 8 fixed on the bottom board 3. The laser beam 6 is transformed by being reflected on the first cylindrical concave mirror 7 into a linear beam 9, which is then incident on the second cylindrical concave mirror 10 with a reflection surface 10A facing the reflection surface 7A of the first mirror 7. The secod cylindrical concave mirror 10 is mounted on a slant-type mount 11.

There is provided a slide unit 12 which has one member supporting the mount 11 and another member supported by a slant base 13 which is secured on the side board 4 by screws 14. The slide unit 12 has an internally threaded section (not shown) which meshes with an adjustment screw 16 supported by a clamp 17 provided on the base 13, so that the second mirror 10 is moved up and down in the direction shown by Y by turning the adjustment screw 16.

The linear laser beam reflected from the second cylindrical concave mirror 10 enters a beam conditioning unit 18. The beam conditioning unit 18 includes a pair of plane mirrors 19 and 20 each of which is supported by a slant base 22 through a slide unit 21 to receive the incident linear beam 9. The base 22 is secured to a side board 4A which is perpendicular to the above-mentioned side board 4. An adjustment screw 24 is arranged to mesh with a clamp 23 provided on the base 22, so that the plane mirrors 19 and 20 are moved in the direction shown by Y with the planes slanting by turning the adjustment screw 24. An angular adjustment screw 26 is attached with its associated spring 25 to the side board 4A so as to position the slide unit 21. When the adjustment screw 26 is turned in the direction X, i.e., into the plane mirror, the slide unit 21 pivoted at the position of the adjustment screw 24 is swung substantially in the horizontal direction. A work piece 27 such as a steel plate, for example, is placed below the second opening 5B of the box 1, and a quenching layer 28 is formed in it by the impingement of the linear laser beam 9.

Next, the operation of the beam conditioning unit 18 will be described with reference to FIG. 1B and FIG. 2.

The linear beam 9 from the second cylindrical concave mirror 10 enters the plane mirror set 19 and 20. The beam 9 having a lengthwise dimension l at the entry of the plane mirror set 19 and 20 is made at the output of the mirror set to have a lengthwise dimention $l_1$ which is smaller than $l$. Then, the laser beam impinges on the surface of the work piece 27 so that a quenching layer 28 is formed in the work piece. In order for the lengthwise dimension of the output laser beam 9' at the output of the plane mirror set 19 and 20 to be increased from $l_1$ to $l_2$. The adjustment screw 24 is turned to lift the plane mirrors 19 and 20 on the slide units 21 to the positions shown by the dashed line 1Y. The beam size can also be reduced by sliding down the plane mirrors. It is also possible to increase the lengthwise dimension of the output laser beam 9' by adjusting the screw 26 so that the plane mirrors 19 and 20 are swung inwardly.

Accordingly, the lengthwise dimension of the output linear beam 9' can be varied for the system using one kind of plane mirror by the adjustment of the screw 24 or 26, whereby the system can be constructed economically and the operation is simplified. In addition, various lengthwise dimensions of the output linear beam 9' can be attained without losing laser energy during the conditioning, resulting in a power saving, that is, the capacity of the laser source can be minimized.

Figure 3A:
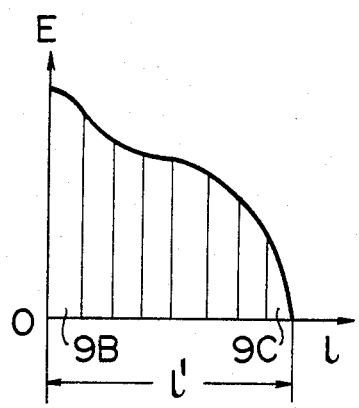
FIGS. 3A and 3B are graphs showing the characteristics of the beam energy distribution.

In the foregoing embodiment, the second cylindrical concave mirror 10 is placed aslant so that it has one end 10B positioned nearer to the work piece 27 than another end 10C as shown in FIG. 1C. In this arrangement, the linear beam 9 from the second cylindrical concave mirror 10 has an energy distribution as shown in FIG. 3A. The graph shows the intensity of laser beam energy (E) on the ordinate plotted against the lengthwise dimension of quenching (l') on the abscissa. As can be seen from the graph, a linear beam 9B has a higher intensity of energy at one end 10B than at another end 10C, and therefore, a quenching layer of a constant depth cannot be obtained. A substantially constant quenching depth can be attained in the following arrangements.

Figure 3B:
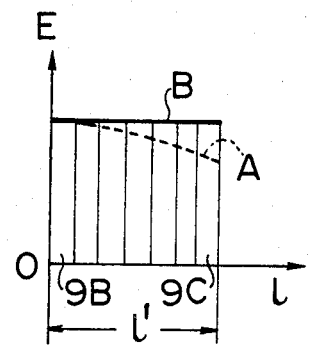

(1) A surface of one plane mirror 20 is made rougher than that of another mirror 19 thereby to reduce reflectivity of the mirror 20, so that the total linear beam 9' conditioned by both plane mirrors has an energy distribution of A in FIG. 3B which is substantially constant over the lengthwise dimention l'.

(2) The second cylindrical concave mirror 10 is provided with a continuously increasing reflectivity across the mirror from one end 10B to another 10C, so that almost constant energy distribution B in FIG. 3B is obtained.

Figure 3C:
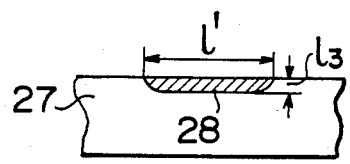
FIG. 3C is a side sectional view of the work piece.

The linear laser beam with energy distribution A or B can form a quenching layer 28 of substantially constant depth $l_3$ as shown in FIG. 3C.

(3) The plane mirrors 19 and 20 are provided with different slant angles. For example, the adjustment screw 26 is turned so that the plane mirror 20 pivoted at the adjustment screw 24 is swung inwardly to have a smaller slant angle, and the irradiation of the linear beam 9 on the plane mirror 20 increases, resulting in a substantially constant energy distribution on the work piece 27.

Although in the foregoing embodiment, the laser machining system used in the quenching process has been described, it can of course be used for other purposes such as shearing, welding, and the like.

According to the laser machining system of the present invention, as described above, a linear laser beam of various lengthwise dimentions can be generated by provision of a simple mirror positioning means for at least a pair of plane mirrors.

We claim:

1. A laser machining system having at least a cylindrical mirror placed aslant for transforming an input laser beam into an output linear beam which is irradiated on to an object for heating, wherein at least a pair of slant-type plane mirrors for reflecting said linear beam are disposed between said cylindrical mirror and said object, at least one of said plane mirrors being provided with means which variably makes the lengthwise dimension of said linear beam at the output of said plane mirror smaller than the lengthwise dimension of said linear beam at the input of said plane mirror.

2. A laser machining system according to claim 1, wherein said variable means comprises means provided at least on one of said slant-type plane mirrors for moving said plane mirror along the irradiation direction of said linear beam, and means provided on the back of said slant-type plane mirror for varying the slant angle of said plane mirror.

3. A laser machining system according to claim 1, wherein said variable means comprises means provided at least on one of said slant-type plane mirrors for moving said plane mirror along the irradiation direction of said linear beam.

4. A laser machining system according to claim 1, wherein said variable means comprises means provided on the back of said slant-type plane mirror for varying the slant angle of said plane mirror.

5. A laser machining system according to claim 1, wherein one of said plane mirrors with higher energy density of said linear beam is made to have a smaller slant angle than the slant angle of another plane mirror.

6. A laser machining system according to claim 2, wherein one of said plane mirrors with higher energy density of said linear beam is made to have a smaller slant angle than the slant angle of another plane mirror.

7. A laser machining system according to claim 3, wherein one of said plane mirrors with higher energy density of said linear beam is made to have a smaller slant angle than the slant angle of another plane mirror.

8. A laser machining system according to claim 1, wherein one of said plane mirrors with higher energy density of said linear beam is made to have a lower reflectivity than the reflectivity of another plane mirror.

9. A laser machining system according to claim 2, wherein one of said plane mirrors with higher energy density of said linear beam is made to have a lower reflectivity than the reflectivity of another plane mirror.

10. A laser machining system according to claim 3, wherein one of said plane mirrors with higher energy density of said linear beam is made to have a lower reflectivity than the reflectvity of another plane mirror.

* * * * *